T. L. VALERIUS.
RIPENER AND PASTEURIZER.
APPLICATION FILED MAR. 11, 1912. RENEWED OCT. 15, 1913.

1,086,629.

Patented Feb. 10, 1914.

Witnesses:
J. C. Devrik.
George L. Chridahl.

Inventor:
Theodore L. Valerius
By Luther L. Miller
Atty.

UNITED STATES PATENT OFFICE.

THEODORE L. VALERIUS, OF FORT ATKINSON, WISCONSIN, ASSIGNOR TO THE CREAMERY PACKAGE MANUFACTURING COMPANY, OF CHICAGO, ILLINOIS, A CORPORATION OF ILLINOIS.

RIPENER AND PASTEURIZER.

1,086,629.      Specification of Letters Patent.      Patented Feb. 10, 1914.

Application filed March 11, 1912, Serial No. 683,146. Renewed October 15, 1913. Serial No. 795,377.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Ripeners and Pasteurizers, of which the following is a specification.

This invention relates to machines used for the purpose of heating or cooling milk or cream, and at the same time keeping the liquid agitated by mechanism kept in motion within the liquid, the temperature of such mechanism being maintained higher or lower than that of the liquid, depending upon whether the liquid is to be heated or cooled.

The invention has for one of its objects the production of mechanism for this purpose which is of such shape as to impart heat to the liquid, or to receive heat from the liquid, in the most rapid and efficient manner.

It has for a further object the production of mechanism which is of such shape and construction as to keep the liquid agitated during the heating or cooling process in the most effective manner.

To illustrate this invention I show herein by means of the accompanying drawings, and shall describe hereinafter, one form of machine by the use of which the results specified may be attained.

Figure 1:
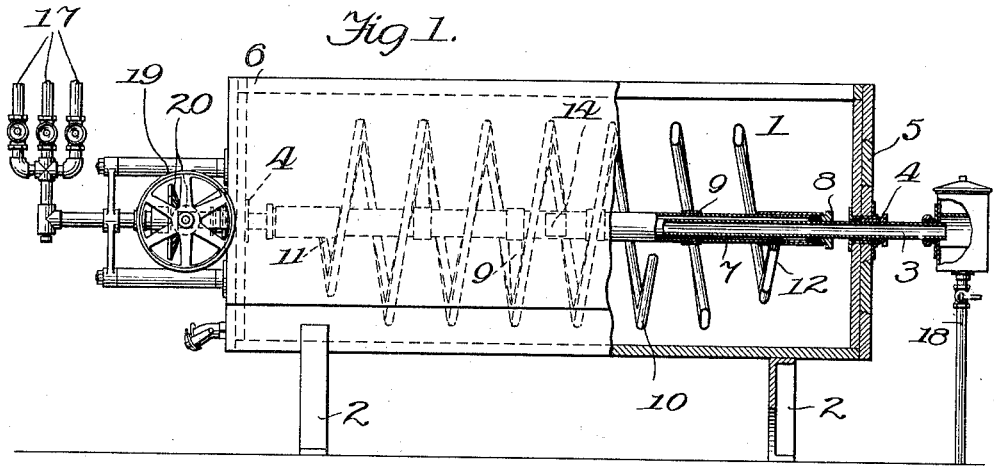
Figures 2, 3, 4:
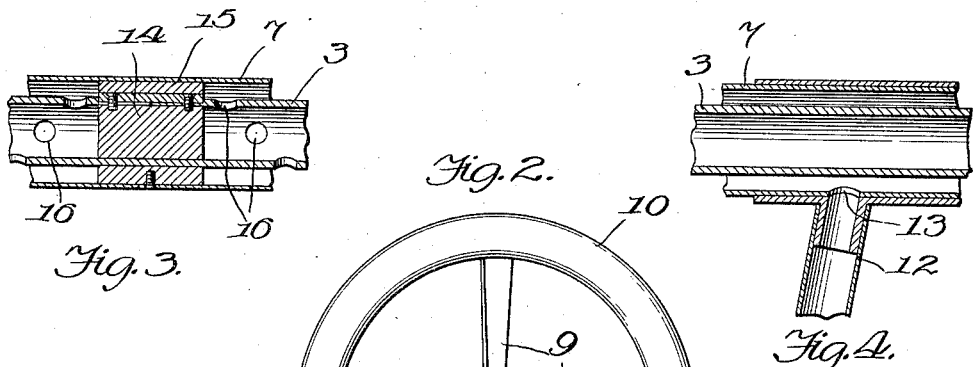
Figure 5:
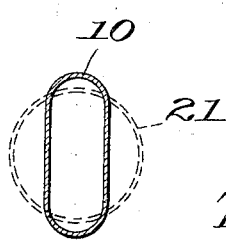

In the drawings, Figure 1 is an elevation partly in section of a cream ripener embodying features of my invention. Fig. 2 is a transverse section of the temperature changing and the agitating mechanism of the machine which consists of a pipe coil. Fig. 3 is an axial section through the hollow shaft and the lining tube upon said shaft. Fig. 4 is a similar section showing the method of connecting the coil end to the lining tube. Fig. 5 is a transverse section of the pipe.

The machine shown by the drawings is what is ordinarily called a cream ripener, and is of the same general construction as the cream ripener set forth and fully described in Patent No. 933,934, issued to me September 14, 1909.

The machine consists of a vat 1, of any suitable shape and construction, into which the milk or cream to be heated or cooled is placed. The vat is supported upon suitable uprights 2, and the means for changing the temperature of, and for agitating the contained liquid, comprises a hollow shaft 3 rotatably supported in bearings 4 in the end walls 5 and 6 of the vat. A tube 7, of larger internal diameter than the outer diameter of the shaft 3, is mounted upon said shaft so as to provide an annular space surrounding said shaft to convey the tempering liquid. The tube 7 may be attached to the shaft in any suitable manner. Herein I have used a stuffing box gland 8 at each end of the tube. Rigidly secured to the exterior of the tube 7, in any suitable manner, as by soldering or brazing, are spokes 9 distributed along the tube. Surrounding the tube, attached to and supported by these spokes, and extending substantially the full length of the tube, is a pipe coil 10, the pipe having a non-circular cross-section, such as shown, by way of example, in Figs. 1 and 5. The ends 11 and 12 of the coil are bent inwardly and are connected to the tube 7 in any suitable manner. Openings 13 connect the interior of the tube 7 to the interior of each of the ends 11 and 12. Plugs 14 and 15 are placed midway between the ends of the coil, in the bore of the hollow shaft 3 and in the annular passageway formed by the tube 7, respectively; and openings 16 in the wall of the shaft, at each side of the plugs 14, connect the interior of the shaft with the annular passageway.

The inlets 17 may be connected with suitable sources of supply of tempering fluid, such as hot water, steam, and cold brine. The tempering fluid may be discharged from the vat by means of the pipe 18. The shaft, carrying with it the coil, may be rotated by means of the drive pulley 19 and the bevel gears 20, or in any other suitable manner.

The vat having been filled with the liquid to be heated or cooled, the operation of the machine is as follows: The tempering fluid is admitted through one of the inlets 17 and passes into the bore of the shaft 3 until it reaches the plug 14. It then passes through the openings 16 into the annular passageway formed by the tube 17, back to the left-hand end of the coil, and through the openings 13 into the end 11 of the coil; thence through the coil to the right-hand end 12, through the opening 13 into the annular passageway, back to the plug 15, and through the openings 16 into the bore of the shaft 3, and out through the discharge pipe 18. In the meantime the shaft and coil are rotated by the application of some suitable power to the pulley 19. The tempering fluid passing through the coil will impart its heat to the liquid to be affected, or will receive heat from the liquid, depending upon whether the tempering fluid is hotter or colder than the liquid. And the rotating coil will keep the liquid in the vat constantly agitated so that all portions of the liquid in turn will receive heat from or impart heat to the coil and its contents. When the machine is thus used to ripen cream, the coil will cause a continuous circulatory movement of the cream from one end of the vat to the other, and back at the sides to the starting point, thus bringing the mass of cream to a uniform temperature, smoothing and emulsifying the cream, mixing it thoroughly with the starter, and insuring that all portions of the body of the cream are brought to a condition of uniform ripeness.

A non-circular cross-section pipe is used for the following reasons: It is well known that the ratio of the area of any inclosing figure to its perimeter is greater when the figure is circular than when it is of any other shape. So that the ratio of the interior volume of a tube to its exterior surface is greater when the cross-section of the tube is circular than when it is of any other shape. Hence, if a tube with a circular cross-section is used for any such purpose as I have indicated herein, the ratio of the amount of tempering fluid in the tube, at any particular instant, to the area of the surface of the tube in contact with the liquid to be tempered will be greater than if the cross-section is of any other shape. And as a consequence, when a given amount of hot tempering fluid is used, heat will be imparted to the liquid to be heated, at a slower rate, if a tube with circular cross-section is used than if a tube with a cross-section of any other shape is used. So that a machine with tubes of circular section and tempering fluid fed at a given rate must use more tempering fluid and larger tubes than if the section of the tubes are non-circular. Similarly, if it is desired to cool liquid contained in the vat, as more brine would be necessary for the same cooling surface with circular tubes, to cool at the same rate with such tubes more brine and larger tubes would be necessary than if the tubes were of non-circular section. For this reason I have produced a hollow tempering element with a non-circular cross-section. And I have shown in Fig. 5 the cross-section of the element which I have used, for the purpose of illustration, in this instance. This cross-section is oblong instead of circular; and, for the purpose of comparison, I show, in dotted lines in the figure, the circle 21, the perimeter of which is equal to that of the oblong figure; and it is easy to see that the area of the circular figure is much greater than that of the oblong figure.

The pipe coil is formed from an ordinary metallic tube which is normally circular in cross section, the tube being distorted to change its shape. The configuration illustrated in Fig. 5 is formed by flattening the coil on opposite sides. This configuration of cross section is the one which I prefer, but it may be varied. Hollow tempering members having helical conductors non-circular in cross-section have been used in the past, but I believe myself to be the first to employ a metallic tube of commercial form distorted to form a conductor having two unequal diameters. This distortion may be conveniently accomplished by flattening the coil to the desired extent. It will, of course, be understood that tubes with cross-sections of other shapes may be used. In any such a case, the amount of tempering liquid and size of the tubes used will be less than when tubes with circular cross-section are used; and also the pipes and vessels necessary to the proper handling of the tempering fluid will be correspondingly decreased in size. A further reason for using a pipe with non-circular cross-section is the following: As already stated, one of the functions of a tempering machine ordinarily is to thoroughly agitate the liquid to be tempered. When a coil is used, such as I have shown in this instance, it is evident that the agitation of the liquid will depend largely upon the screw-like action of the coil in forcing the liquid from one end of the vat to the other. And the rate of flow, and consequently the amount of agitation, will depend more upon the effective longitudinal pushing surface of the coil than upon the total surface of the coil. And the pushing surface will be the surface perpendicular to the axis of rotation of the coil. By making the cross-section of the tubes of the coil non-circular, greater surface for a given volume capacity of the tube results as hereinbefore shown; and in such a case, one diameter of the cross section will usually be greater than if the section were circular. Hence by using a non-circular section, and by placing the greatest diameter of the cross-section perpendicular to the axis of rotation of the coil, greater agitation will result than if a circular section is used under similar circumstances. In view of these facts, I have not only used a non-circular tube in cross-section, but have also, as indicated in Fig. 1, so arranged the tubes that the greatest diameter of the section will be substantially perpendicular to the axis of rotation of the coil; and by this arrangement I produce greater agitation of the liquid for a given rate of rotation of the shaft than if tubes of circular cross-section were used, or than if the shorter diameter were placed perpendicular to the axis.

It is evident that if tubes are used with non-circular cross-section of other shapes than the one illustrated, and the greater diameter is placed substantially perpendicular to the axis, a greater rate of tempering and greater agitation will result for a given amount of tempering fluid and rate of rotation than if tubes of circular cross-section are used. So that it is to be understood that I do not confine myself to the shape shown in this instance, either for the purpose of changing the temperature, or for agitating the liquid.

I claim as my invention:

1. A ripener or pasteurizer having a rotary tempering device which includes a helical coil of commercial tubing distorted to form unequal diameters, the greater diameter of the tubing extending substantially perpendicular to the axis of the coil.

2. A ripener or pasteurizer having a rotary tempering device which includes a spirally twisted length of commercial tubing distorted to form unequal diameters.

In testimony whereof I affix my signature in the presence of two witnesses.

THEODORE L. VALERIUS.

Witnesses:
CHAS. W. FERRIS,
W. W. CORNISH.

Copies of this patent may be obtained for five cents each, by addressing the "Commissioner of Patents, Washington, D. C."